US009452905B2

(12) United States Patent
Muderlak et al.

(10) Patent No.: US 9,452,905 B2
(45) Date of Patent: Sep. 27, 2016

(54) HANDLE COVER ASSEMBLY

(71) Applicant: Xela Innovations, LLC, Glendale, WI (US)

(72) Inventors: Todd J. Muderlak, Whitefish Bay, WI (US); Kenneth J. Muderlak, Milwaukee, WI (US)

(73) Assignee: XELA INNOVATIONS, LLC, Glendale, WI (US)

( * ) Notice: Subject to any disclaimer, the term of this patent is extended or adjusted under 35 U.S.C. 154(b) by 482 days.

(21) Appl. No.: 13/802,473

(22) Filed: Mar. 13, 2013

(65) Prior Publication Data

US 2014/0263807 A1    Sep. 18, 2014

(51) Int. Cl.
*B65H 16/00* (2006.01)
*B62B 5/06* (2006.01)
*A47K 10/28* (2006.01)

(52) U.S. Cl.
CPC ............. *B65H 16/005* (2013.01); *B62B 5/069* (2013.01); *A47K 10/28* (2013.01); *B65H 2701/1752* (2013.01)

(58) Field of Classification Search
CPC ..... A47K 10/28; B62B 5/069; B65H 16/005
USPC ...................................... 242/594.3
See application file for complete search history.

(56) References Cited

U.S. PATENT DOCUMENTS

| | | |
|---|---|---|
| 2,903,734 A | 9/1959 | Inman |
| 3,280,491 A | 10/1966 | Jeshayahu |
| 3,356,305 A | 12/1967 | De Martini et al. |
| 3,968,941 A | 7/1976 | Catto |
| 3,981,571 A | 9/1976 | Robertson |
| 4,046,508 A | 9/1977 | McDonald |
| 4,213,212 A | 7/1980 | Hefty et al. |
| 4,566,648 A | 1/1986 | Hefty et al. |
| 4,644,689 A | 2/1987 | Arians |

(Continued)

FOREIGN PATENT DOCUMENTS

| | | | |
|---|---|---|---|
| CN | 2668770 Y | 1/2005 | |
| DE | 2825929 A1 * | 1/1980 | ............... B62B 5/06 |

(Continued)

OTHER PUBLICATIONS

English Translation of DE2825929A1, Espacenet.com.*

(Continued)

*Primary Examiner* — Sang Kim
*Assistant Examiner* — Nathaniel Adams
(74) *Attorney, Agent, or Firm* — Husch Blackwell LLP

(57) ABSTRACT

Disclosed herein is a handle cover assembly. The assembly is structured to dispense and recover handle cover material, such as a hygienic handle cover material in the form of a sheet, web, sleeve, or the like. The assembly includes a housing configured and/or structured to serve as a handle and which provides an interior in which handle cover assembly components and handle cover material are at least partially contained, from which handle cover material is dispensed, and to which handle cover material is recovered. In at least some embodiments, the handle cover material is dispensed from the interior of the assembly to at least partially cover at least a portion of the outer surface of the assembly housing. The assembly can be connected to a structure, such as cart (e.g., shopping cart, luggage cart), that includes a handle as a retrofit, or installed during manufacture.

23 Claims, 14 Drawing Sheets

(56) References Cited

U.S. PATENT DOCUMENTS

| | | |
|---|---|---|
| 4,658,469 A | 4/1987 | Hawkins |
| 4,710,634 A | 12/1987 | Brookes |
| 4,817,239 A | 4/1989 | Campbell |
| 4,997,139 A | 3/1991 | Menard |
| 5,253,372 A | 10/1993 | Boker |
| 5,561,867 A | 10/1996 | Roginsky |
| 5,647,074 A | 7/1997 | White, Jr. et al. |
| 5,937,448 A | 8/1999 | Brill et al. |
| 5,975,083 A | 11/1999 | Henderson, Jr. |
| 5,983,454 A | 11/1999 | Hartselle, III |
| 6,076,198 A | 6/2000 | Meierdierck |
| 6,189,183 B1 | 2/2001 | Hartselle, III |
| 6,213,424 B1 | 4/2001 | Helfer-Grand |
| 6,237,805 B1 | 5/2001 | Katsanevas |
| 6,289,557 B1 | 9/2001 | Manson et al. |
| 6,293,598 B1 | 9/2001 | Rusiana |
| 6,308,346 B1 | 10/2001 | Brill et al. |
| 6,353,971 B1 | 3/2002 | Krawczyk |
| 6,508,383 B2 | 1/2003 | Lidahl et al. |
| 6,546,765 B1 | 4/2003 | Linares |
| 6,645,435 B2 | 11/2003 | Dawson et al. |
| 6,749,148 B2 | 6/2004 | Helfer-Grand |
| 6,789,695 B1 | 9/2004 | Gaudreau |
| 7,201,415 B2 | 4/2007 | Elwell |
| 7,716,789 B1 | 5/2010 | Zevallos |
| 7,762,492 B2 | 7/2010 | Muderlak et al. |
| 8,276,839 B2 | 10/2012 | Muderlak et al. |
| 2003/0122556 A1 | 7/2003 | Sueyoshi et al. |
| 2008/0000924 A1* | 1/2008 | Brady et al. .................. 221/76 |

FOREIGN PATENT DOCUMENTS

| | | |
|---|---|---|
| DE | 202004014950 U1 | 1/2005 |
| EP | 0448122 A | 9/1991 |
| WO | 2007121220 A3 | 10/2007 |

OTHER PUBLICATIONS

Restroom Decor: Germy Doorknobs Inspire Inventors; The Wall Street Journal Online, http://online.wsj.com/article_prinUSB120304303081570707.html; Feb. 15, 2008; 3 pages.

SaniCart Wipe; http://www.nicepak.com/images/technical_bulletin/SaniCartWipe_TB_v3.pdf; at least as early as Nov. 2008; 2 pages.

PureCart—PureChem Systems; http://www.purechemsystems.com/purecart.php; at least as early as Nov. 2008; 2 pages.

The Healthy Handle; http://www.thehealthyhandle.com/index.html; at least as early as Nov. 2008; 2 pages.

The Clean Shopper Shopping Cart Cover—Babe Ease LLC; http://www.cleanshopper.com.au/cleanshopper.php; at least as early as Nov. 2008; 3 pages.

* cited by examiner

HANDLE COVER ASSEMBLY

FIELD

The disclosure generally relates to devices, assemblies and methods of covering handles, or surfaces or structures configured to serve as handles. In one aspect, the disclosure relates to covering a handle on a structure, such as a cart, or like structure.

BACKGROUND

People frequently encounter and come into contact with objects that have been previously and/or frequently touched by others. Such objects surfaces can be contaminated with bodily fluids, such as sweat and mucus. Moreover, illness, such as the common cold, can be passed through hand touch. As a result, many people adjust their behavior due to actual and/or perceived unsanitary conditions associated with such frequently touched surfaces. However, in some instances, avoidance and/or behavior change is not feasible.

In one example, grocery stores, other big box retailers and airports that provide shopping carts are increasingly looking to limit germ exposure for customers and their families, in part, because bacteria on shopping and luggage cart handles is a potential health issue. This can be a concern, real or perceived, for many, especially for those with inhibited immune function. For example, infants typically have weaker immune systems than adults and, additionally, infants are frequently put or place objects in their mouths.

In response, some venues provide or place extremely expensive "cart handle washing" contraptions and unattractive and/or expensive cleaning wipes throughout stores. However, solutions such as this are typically inconvenient, especially when actually needed, as well as harsh on the hands. For example, a store might provide wipes at an entrance, near a location of shopping carts. However, a person my begin to push the cart into the store a good distance, and then determine that sanitization of the handle of the cart is desired, but only to realize that the wipes are located back near where they entered the store.

It would be desirable to provide a mechanism or assembly to maintain a sanitary and dry handle surface, for example, on carts. It would further be desirable to provide an automated way to sanitize and otherwise maintain the cleanliness of handles for a user that does so in a practical, easy-to-install, efficient and cost effective manner.

SUMMARY

In accordance with at least some embodiments, the disclosure provides a handle cover assembly comprising: a housing structure having an interior; a first handle cover providing spool structure positioned at least partially within in the interior and rotatable about a first handle cover providing spool structure axis of rotation; and a first handle cover receiving spool structure positioned at least partially within the housing structure interior and rotatable about first handle cover receiving spool structure axis of rotation that is at least substantially parallel to, but offset from, the first handle cover providing spool structure axis of rotation. In at least some embodiments, the housing is connectable to another structure, such as a cart.

In at least some embodiments, the handle cover assembly can further include a second handle cover providing spool structure positioned at least partially within in the interior and rotatable about a second handle cover providing spool structure axis of rotation; and a second handle cover receiving spool structure positioned at least partially within the housing structure interior and rotatable about a second handle cover receiving spool structure axis of rotation that is at least substantially parallel to, but offset from, the second handle cover providing spool structure axis of rotation. In at least some embodiments, the housing is connectable to another structure, such as a cart.

In at least some embodiments, the disclosure also provides a method of using the handle cover assembly: providing a handle cover material from the first handle cover providing spool structure about, so as to cover, at least a portion of an exterior surface of the housing structure, and receiving the handle cover material using the first handle cover material receiving spool structure within the interior of the housing. In at least some embodiments, the method can include connecting the housing, or configuring the housing for connection, to another structure, such as a cart In accordance with at least some embodiments, the disclosure further for a combination comprising: a handle cover assembly comprising: a housing structure having an interior; a first handle cover providing spool structure positioned at least partially within in the interior and rotatable about a first handle cover providing spool structure axis of rotation; and a first handle cover receiving spool structure positioned at least partially within the housing structure interior and rotatable about first handle cover receiving spool structure axis of rotation that is at least substantially parallel to, but offset from, the first handle cover providing spool structure axis of rotation; and an additional structure having, or configured for use, with a handle.

Other non-limiting embodiments, features, aspects and/or advantages associated with embodiments of the present disclosure will become apparent in view of the detailed description, the drawings and the claims.

BRIEF DESCRIPTION OF THE DRAWINGS

Embodiments of the disclosure are disclosed with reference to the accompanying drawings and are for illustrative purposes only. The disclosure is not limited in its application to the details of construction or the arrangement of the components illustrated in the drawings. The disclosure is capable of other embodiments or of being practiced or carried out in other various ways. Like reference numerals are used to indicate like components. Indications or terms of direction, orientation and the like (e.g., front, rear, above, below, etc.) are provided for reference purposes and to facilitate understanding, but are not intended to limit the disclosure. In the drawings.

DETAILED DESCRIPTION

Figure 1:
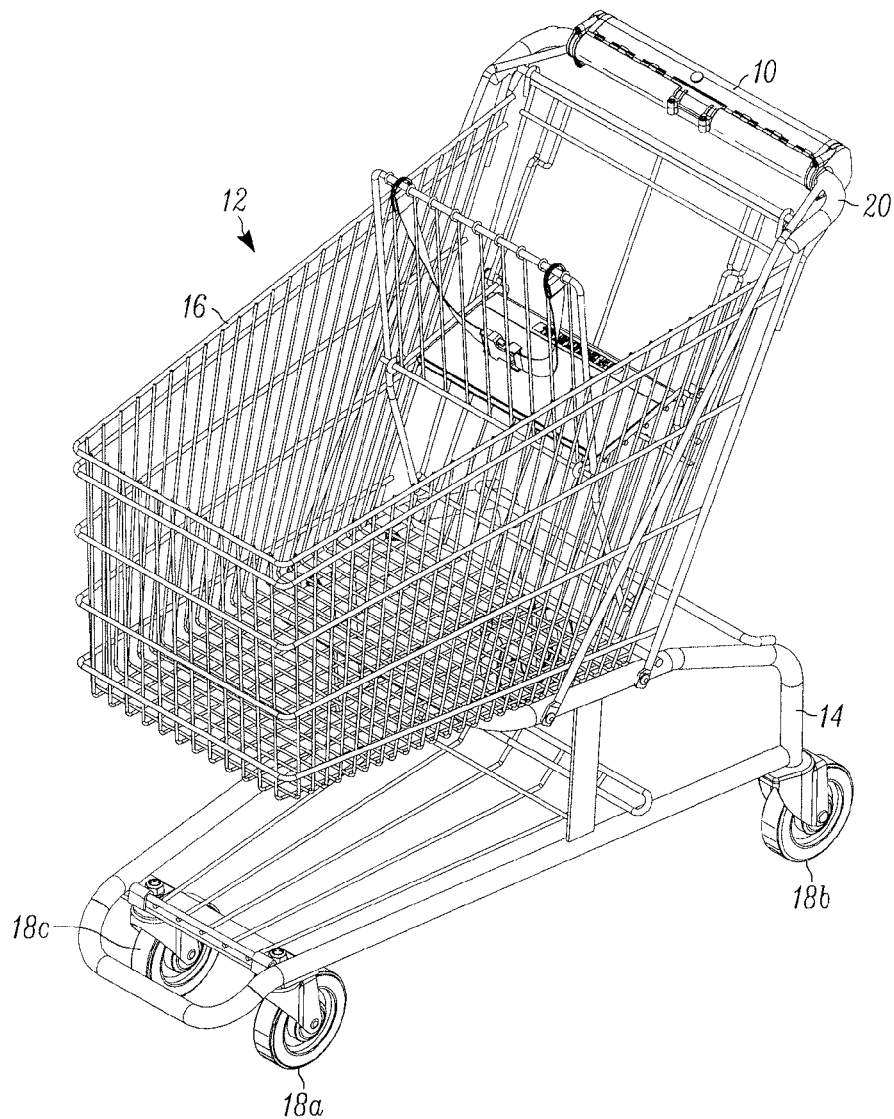
FIG. 1 is a front perspective view of an exemplary cart, a shopping cart, having a handle cover assembly, in accordance with embodiments of the present disclosure.
Figure 2:
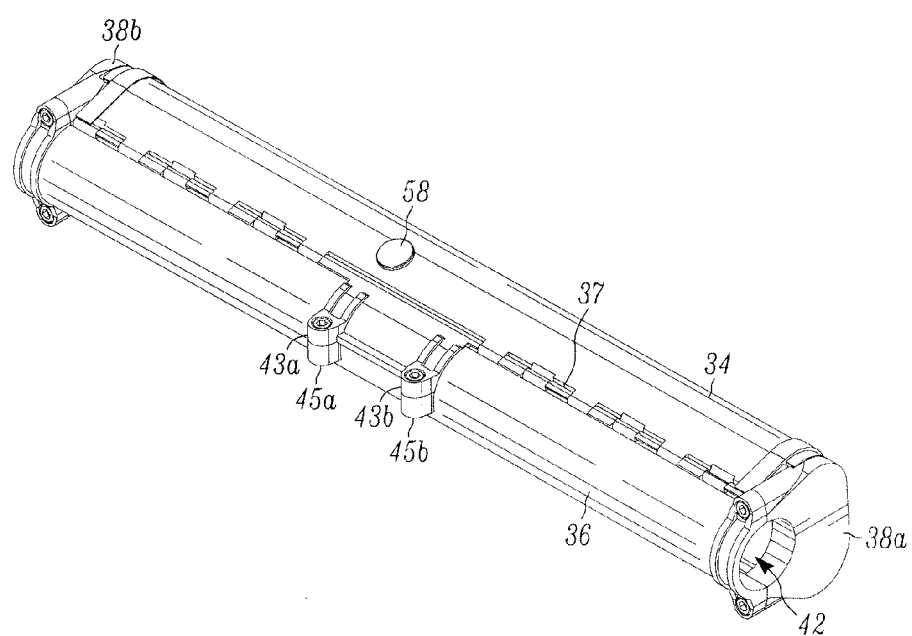
FIG. 2 is a front perspective view of the handle cover assembly of FIG. 1, in accordance with embodiments of the present disclosure.

FIG. 1 is a perspective view of a handle cover assembly 10 which is connected with an exemplary cart 12, such as a typical shopping or grocery cart, in accordance with embodiments of the present disclosure. FIG. 2 is a perspective view of the handle cover assembly 10 of FIG. 1. Cart 12 generally includes a frame 14 which is connected to and supports a basket 16 for containing contents, such as one or more articles of merchandise (not shown), food, or other products, and to which a plurality of wheels 18a-c are connected in order to permit transport of such contents from one location to another by a user (not shown). A user, to accomplish such transport, typically grasps and pushes on the cart handle 20, which typically takes the form of an elongated rounded or tubular structure that is generally connected to the frame. In accordance with at least some embodiments, the handle cover assembly 10 connected to, and is configured to be connected to, the cart 12 by virtue of the cart handle 20, as will be described further below.

It shall be understood that the type or variety of carts to which the handle cover assembly 10 can be connected is not limited to the kind illustrated herein, but rather, can include any of a variety of other carts or similar devices or structures that utilize or include handles or handle structures, such as luggage and other carts, which can be used to transport goods from one location to another. Moreover, it is contemplated that the handle cover assembly 10 can be connected or connectable to other structures, including structures other than carts or similar structures that utilize or include handles or handle structures.

Further, while the handle cover system is shown to be connected to the cart handle 20, it shall be understood that, in other embodiments, the handle cover assembly 10 can be connected to, or connectable to, other areas of the structure. Further still, in accordance with at least some alternative embodiments, while the handle cover assembly 10 is shown to be connected to the cart 12 by way of the cart handle 20, it is contemplated that the handle cover assembly can altogether replace the cart handle such that the cart handle 20 may be altogether eliminated, for example, during manufacture of the cart 12. For example, it is contemplated that the handle cover assembly 10, in accordance with at least some embodiments, may be connected to another portion of the cart 12, such as its frame 14 (or an extension thereof), or its basket 16, or another portion or structure. Accordingly and at least in this way, it shall be understood that the handle cover assembly 10 can be integrated into, or with respect to, the cart 12 or other structure, such as during manufacture or assembly of the cart or other structure.

Figure 3:
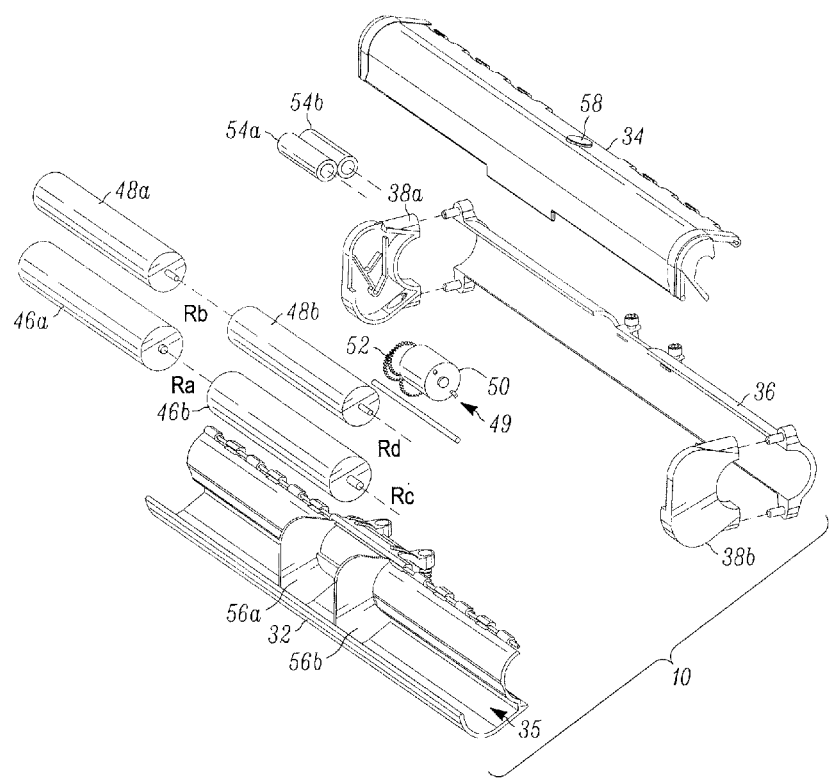
FIG. 3 is an exploded front perspective view of the handle cover assembly of FIG. 2, showing components of the assembly, in accordance with embodiments of the present disclosure.
Figure 4:
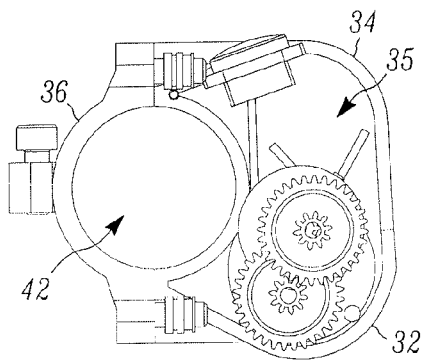
FIG. 4 is a cross-sectional view taken along line 4-4 of FIG. 2.
Figure 5:
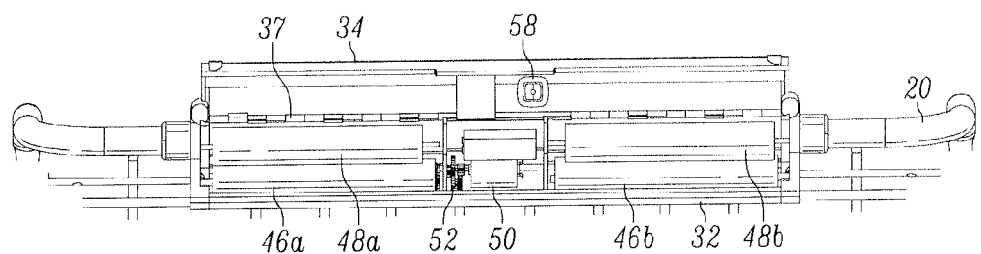
FIG. 5 is an enlarged top view showing the handle cover assembly attached to the handle of a structure, such as the cart of FIG. 1, with the handle cover assembly shown in an open position, exposing components of the handle cover assembly, in accordance with embodiments of the present disclosure.

FIG. 3 is an exploded perspective view of the handle cover assembly 10 of FIGS. 1 and 2, but taken from an opposite orientation (e.g., rear as opposed to front) showing components of the system, in accordance with embodiments of the present disclosure. FIG. 4 is a cross-sectional view taken along line 4-4 of FIG. 2. And FIG. 5 is an enlarged top view of a portion of FIG. 1, showing the handle cover assembly 10 attached to the handle 20 of the cart, with the handle cover assembly shown in a closed position, in accordance with embodiments of the present disclosure.

With reference to FIGS. 2, 3, 4 and 5, handle cover system 10 includes a housing, which is generally referred to by the numeral 30. The housing 30 includes a first housing section 32 and a second housing section 34, which are connectable to one another and, when so connected together, can create an interior or enclosure 35 (FIG. 4) for containing components of the handle cover assembly 10 therein. Second housing section 34 is connected to first housing section 32 by way of hinged connection 37, to permit movement of the second housing section between a closed position (FIGS. 2 and 4) and an open position (FIG. 5), with the closed position providing an enclosure for and the open position providing access to the interior 35 of the housing 30.

Figure 6:
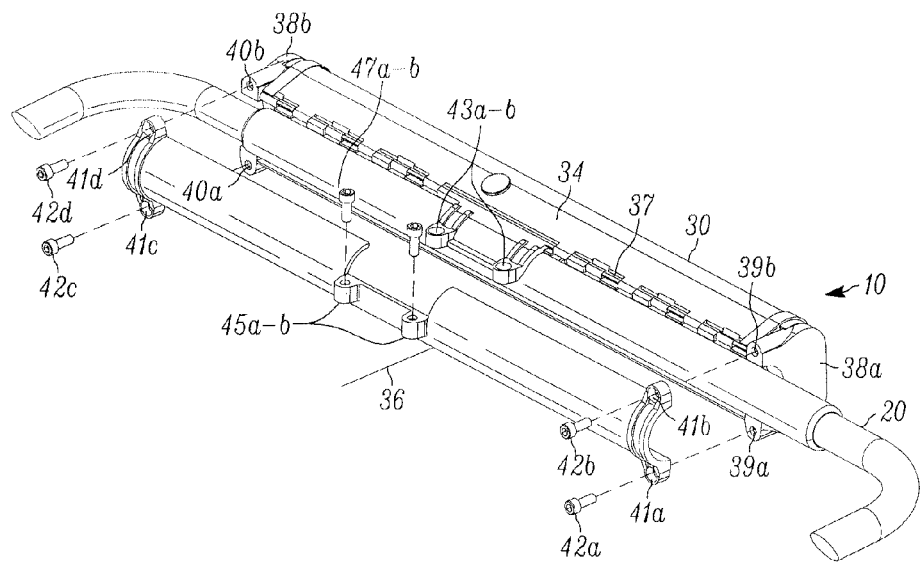
FIG. 6 illustrates a partially exploded front perspective view of the handle cover assembly, showing the assembly of FIG. 3 and further illustrating its attachment or connection to a handle of a structure, such as the cart of FIG. 1, in accordance with embodiments of the present disclosure.
Figure 7:
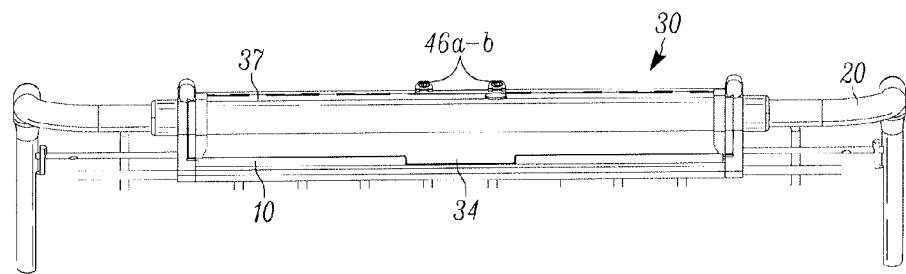
FIG. 7 is an enlarged top view of a portion of FIG. 1 showing the handle cover assembly attached to the handle of the cart, and with the handle cover assembly shown in an closed position, in accordance with embodiments of the present disclosure.

In accordance with at least some embodiments, the assembly is provided with an additional section 36, as well as end cap sections 38a-b which are used to connect the handle cover assembly to the handle 20. FIG. 6 illustrates a partially exploded front perspective view of the handle cover assembly 10 of FIG. 3 and further illustrating its attachment or connection to the handle 20 of the cart 12 (FIG. 1), in accordance with embodiments of the present disclosure. FIG. 7 is an enlarged top view of a portion of FIG. 1 showing the handle cover assembly 10 attached to the handle 20 of the cart 12, and with the handle cover assembly shown in a closed position, in accordance with embodiments of the present disclosure.

With particular reference to FIG. 6, end cap sections 38*a-b* include connection areas 39*a-b* and 40*a-b*, respectively, which connect the end cap sections 38*a-b*, respectively, to the additional section 36 via its respective connection areas 41*a-b* and 41*c-d*, respectively. Each of the connection areas 39*a-b* and 40*a-b* of the end cap sections 38*a-b*, respectively, take the form of recesses extending into the respective end cap sections, while the connection areas 41*a-d* of the additional section 36 take the form of extensions with recesses formed therein. Connection mechanisms 42*a-d*, such as hexagonal nuts, screws or the like, are be used to securely connect the respective end cap sections 38*a-b* and additional section 32 together via the connection areas 39*a-b* of the end cap sections, and the connection 40*a-b* and 41*a-d* for the additional section 36. Other types, forms, shapes and structures for the one or more of the connection areas and connection mechanisms are contemplated and considered within the scope of the present disclosure.

Moreover, and with additional reference to FIG. 2, a handle receiving space, generally referred to by numeral 42, is created and provided by portions of the housing sections. As can be seen, each of the first housing section 32, the second housing 34 and the end cap sections 36 include one or more surfaces that are cylindrically shaped or contoured to accommodate the handle of the structure to which the handle cover assembly is to be connected, such as the generally cylindrical or tubular shaped cart handle 20 (FIG. 1) previously referenced. It shall be understood that handle cover assembly 10, including one or more of its housing components, can be configured to accommodate and connect to any of a variety of handles or other structures and is not limited to a handle of any particular shape, size or dimension.

With continuing reference to FIGS. 6 and 7, the second housing sections 34 includes connections 43*a-b* which interface with additional connections areas 45*a-b* of the additional section 36, and these connection and additional connection areas take the form of extensions having recesses or holes therein. Connection mechanisms 47*a-b* are shown, and which are used to secure the connection and additional connection areas 43*a-b* and 45*a-b*, respectively, together to further secure the handle cover assembly 30 to the handle 20, as is illustrated in FIG. 7. As before, connection mechanisms 47*a-b* can comprise, but are not limited to, hexagonal nuts, screws, or the like. Other types, forms, shapes and structures for the one or more of the connection areas and connection mechanisms are again contemplated and considered within the scope of the present disclosure. In sum, in accordance with at least some embodiments of the present disclosure, the handle cover assembly 10 is fixedly secured to the handle 20 of the cart 12 (FIG. 1), or other structure, via the connection areas 39*a-b*, 40*a-b*, 43*a-b* and 45*a-b*, together with the respective connection mechanisms 42*a-d* and 47*a-b*. Other mechanisms, devices, structures and configurations for securing or fastening the handle cover assembly 10 are contemplated and considered within the scope of the present disclosure.

With continuing reference to the aforementioned Figures, and particularly with respect to FIGS. 3, 4 and 5, the handle cover assembly 10 further includes a first handle cover material supply structure 46*a* and a second handle cover material supply structure 46*b*, as well as respective first and second handle cover material receiving structures, 48*a-b*. In accordance with at least some embodiments, each of these supply and receiving structures rotate about a respective axis of rotation, Ra, Rb, Rc, and Rd, such that respective pairs of axes of rotation, namely Ra and Rb, as well as Rc and Rd, are parallel with, or at least substantially parallel with, and yet offset from, each other. In accordance with at least some embodiments, each of these supply and receiving structures rotate about a respective axis of rotation, Ra, Rb, Rc, and Rd, such that respective pairs of axes of rotation, namely Ra and Rb, as well as Rc and Rd, are parallel with, or at least substantially parallel with, and yet offset from, each other and where such respective parallel (or at least substantially parallel) axes are further parallel to (or at least substantially parallel to) an axes or a surface of the handle of the structure to which the assembly is connected, or otherwise associated. In accordance with at least some embodiments, one or both of the first and second handle cover material supply structures and one or both of the handle cover material receiving structures can take the form of cylindrically-shaped structures (e.g., rollers, spools, etc.). In other embodiments the support structures take on different shapes or geometries.

The handle cover assembly 10 further includes a drive assembly, referenced by the numeral 49, and which includes a motor 50 (FIG. 3) connected to a gear assembly or gear train, generally referred to by numeral 52. In accordance with at least some embodiments, the motor drives, via the gear assembly 52, rotation of the handle cover receiving spool structures 48*a-b* about their respective axes of rotation. Such rotation can be clockwise or counterclockwise, depending upon, among other things, the manner in which the handle cover material (not shown in the present Figures) is provided (e.g., wound or rolled) onto the handle cover receiving spools 48*a-b*. In this way, the handle cover material is pulled from the supply spool structures 46*a-b* and fed or otherwise advanced to the receiving spool structures 48*a-b*. One exemplary motor suitable for use in the present is a DC motor, such as those provided by Mabuchi Motor or Johnson Motor, located in Japan, China and the USA, respectively. Other gears, gear assemblies and/or gear trains are contemplated and considered within the scope of the present disclosure.

Also shown are a plurality of batteries 54*a-b* (e.g., C, D, NiCad, AA, etc.), and these batteries can be used to power motor 50 and other items or components of the handle cover assembly 10. For example, the batteries 54*a-b* can be used to power a plurality of indicator light emitting diodes (LED's), which can be used to indicate, for example, depletion or near depletion of handle cover material (again, not shown in this view), as well as to indicate low power, or low battery. Various securing structures can be used to fixedly secure and/or contain the aforementioned components within the interior of the housing 30. For example, second housing portion 34 is shown to include two wall structures 56*a-b* which can serve, at least in part, to contain the respective handle cover supply structures 46*a-b* and the motor and gearing assemblies 50 and 52, respectively, in respective locations within the housing. Additionally, other structures, such as clips, fasteners, and other structures that may serve to facilitate insertion and removal of various components, as well as to provide sturdy support for such components once installed, may be used. Also illustrated is an activation button 58 which is operatively associated with the handle cover assembly 10 and configured to permit a user to advance an amount of handle cover material. The number and type of batteries can vary depending on the power needs of the device and, similarly, the orientation or positioning of batteries can also vary. Holes can be included to permit the viewing of indicator lights (e.g., LEDs) contained within the housing and secured, although the precise location of such holes can vary.

In at least some embodiments, the handle cover assembly 10 can include a metering plate, or other device, to meter the amount or quantity of handle cover material and to automatically dispense (or recover/take up) during use. In at least some alternative embodiments, it is contemplated that the button or similar device may be replaced with another device that permits the user to advance the handle cover material, such as a sensor (e.g., infrared sensor) that senses and is activated by user movement (e.g., waving).

More particularly, in at least some embodiments, a switch or other device may be provided that is configured to work in tandem with spool structures and metering device to meter the appropriate amount of handle cover material(s) to dispense following use of the device by a user. This can enable the switch to monitor the amount or length of handle cover material dispensed in total. An appropriate signal can be provided (e.g., illumination of the previously described LED's, or using a different color handle cover on the last specified number of handle cover feet) when the device, and particularly a respective supply spool structure is empty or nearly empty.

The measurement and metering device (not shown) is or typically can be in operational association with at least one sensing device, such as a magnetic sensing device or optical sensor (not shown), and the motor assembly to effect measuring and/or metering of a proper amount of handle cover material during use of the assembly. The measurement and metering device can function similarly to an odometer by recording the amount of handle covers dispensed, and thus it can serve to identify how much handle cover material to advance for a new sanitary use to identify when the supply of handle covers within the assembly requires replacement and/or refill. Other structures, assemblies and devices for accomplishing metering and/or measurement of the handle cover material and handle cover usage are contemplated and considered within the scope of the present disclosure.

In yet other embodiments, it is contemplated that the handle cover assembly may be manually operated and such modification can be made. In such instances, by way of example, the motor may be removed or eliminated, and appropriate provision (e.g., a crank or other physical structure connected directly or indirectly to one or more of the spool structures) may be made to permit manual advancing of handle cover material.

Figure 8:
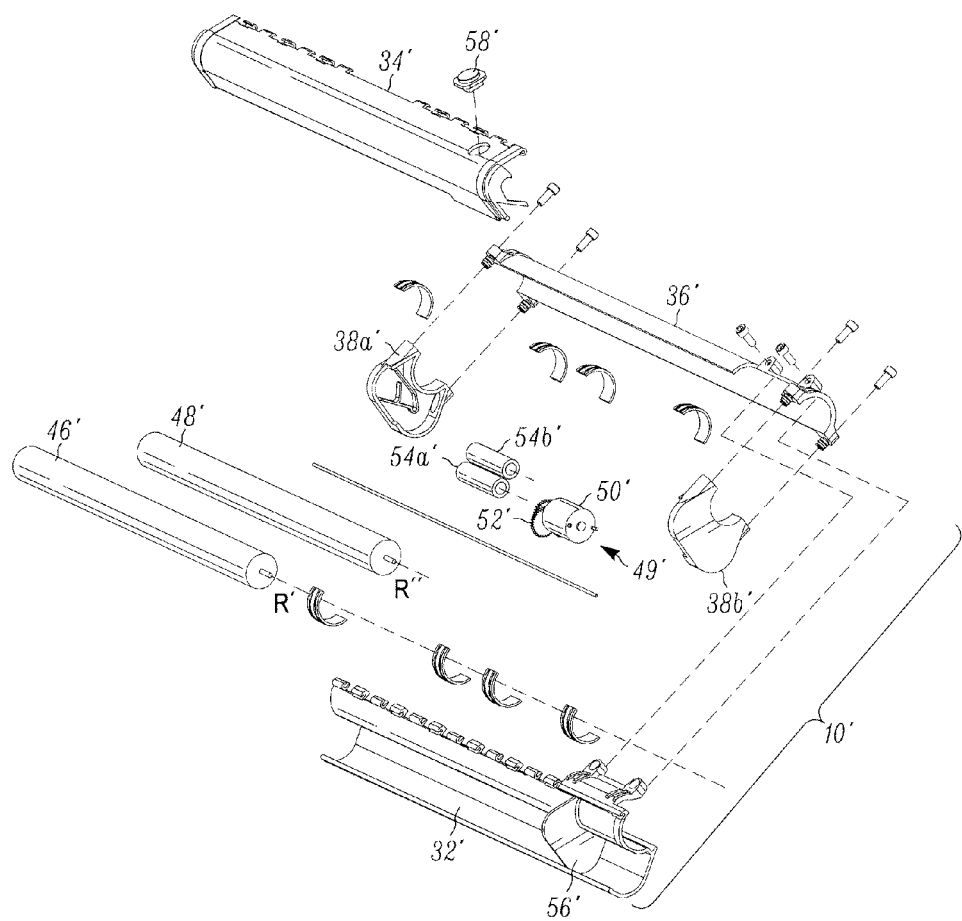
FIGS. 8 and 9 are exploded and top views, respectively, which are similar to FIGS. 3 and 5, of another embodiment of a cart handle cover dispenser, in accordance with embodiments of the present disclosure.
Figure 9:
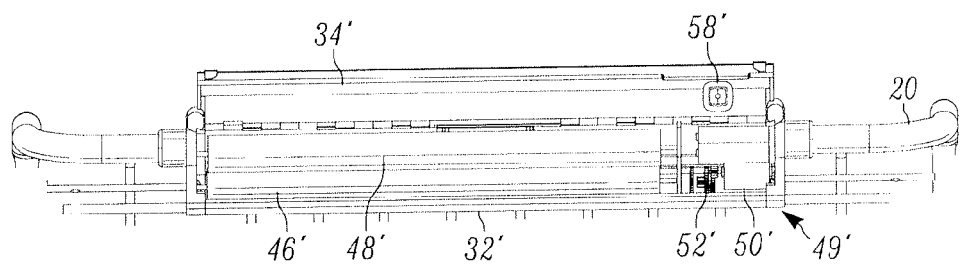
Figure 10:
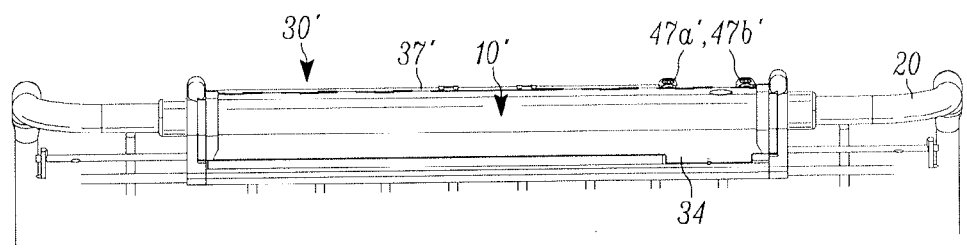
FIG. 10 is an enlarged top view of a portion, similar to FIG. 7, showing the handle cover assembly of FIGS. 8 and 9 attached to the handle of the cart, and with the handle cover assembly shown in an closed position, in accordance with embodiments of the present disclosure.

With reference to FIGS. 8 and 9, are exploded and top views, respectively, which are similar to FIGS. 3 and 5, of another embodiment of a cart handle cover assembly 10', in accordance with embodiments of the present disclosure. FIG. 10 is an enlarged top view of a portion, similar to FIG. 7, showing the handle cover assembly of FIGS. 8 and 9 attached to the handle of the cart, and with the handle cover assembly shown in an closed position, in accordance with embodiments of the present disclosure.

Shown is a handle cover assembly 10' having many like parts and components of the assembly described previously with respect to FIGS. 2-7. For simplicity and ease of understanding, some of the common parts are not referenced again here. It is noted, however, that, in accordance with the present embodiment, the handle cover assembly 10' includes only a single handle cover material, first handle cover material supply spool structure 46', and a single second handle cover material receiving spool structures, 48'. In accordance with at least some embodiments, each of these spool structures rotates about a respective axis of rotation, in this instance R' and R''. Axes of rotation R' and R'' are offset from, and yet are parallel with, or at least substantially parallel with, each other. Here as well, in at least some embodiments, such respective parallel (or at least substantially parallel) axes are further parallel to (or at least substantially parallel to) an axes or a surface of the handle of the structure to which the assembly is connected, or otherwise associated. In accordance with at least some embodiments, each of the handle cover material supply and receiving spool structures are cylindrically-shaped structures (e.g., rollers, spools, etc.), but, as before, are not limited to such structures.

Otherwise, handle cover assembly 10' includes a housing, which is generally referred to by the numeral 30'. The housing 30' includes a first housing section 32' and a second housing section 34', which are connectable to one another by way of hinged connection 37', to permit movement of the second housing section between a closed position and an open position (FIG. 9). In accordance with at least some embodiments, the assembly is provided with an additional section 36', as well as end cap sections 38a'-b' which are used to connect the handle cover assembly to the handle 20. FIG. 6 illustrates a partially exploded front perspective view of the handle cover assembly 10' of FIG. 3 and further illustrating its attachment or connection to the handle 20 of the cart 12, or other structure having, using or configured to use a handle (e.g., FIG. 1), in accordance with embodiments of the present disclosure. Connection areas and connection mechanisms to connect various sections of the housing to the handle, or similar structure, of the cart, or other structure to which the assembly 10' might be connected. Other types, forms, shapes and structures for one or more of the connection areas and connection mechanisms are contemplated and considered within the scope of the present disclosure. Each of the first housing section 32', the second housing 34' and the end cap sections 36' include one or more surfaces that are cylindrically shaped or contoured to accommodate, by way of a handle receiving space (not visible), the handle of the structure to which the handle cover assembly is to be connected, such as the generally cylindrical or tubular shaped cart handle 16 (FIG. 1) previously referenced. It shall be understood that handle cover assembly 10, including one or more of its housing components, can be configured to accommodate and connect to any of a variety of handles or other structures and is not limited to a handle of any particular shape, size or dimension.

The second housing sections 34' includes connections which interface with additional connections areas of the additional section 36', and connection mechanisms are again used to secure the connection and additional connection areas, respectively, together to further secure the handle cover assembly 30' to the handle 20. The handle cover assembly 10' is or can be fixedly secured to the handle 20 of the cart 12, or other structure, using a variety of connection areas, mechanisms, devices, structures and configurations, which are contemplated and considered within the scope of the present disclosure. The handle cover assembly 10' further includes a drive assembly 49' having a motor 50' connected to a gear assembly or gear train, which is generally referred to by numeral 52' as noted previously noted. Other features previously noted can be included in the present embodiment, including various securing structures that can be used to fixedly secure and/or contain the aforementioned components within the interior of the housing 30. In the present embodiment, second housing portion 34' is shown to include only a single wall structure 56' which can serve, at least in part, to contain the respective handle cover supply and receiving structures, as well as the drive assembly 49', respectively, in respective locations within the housing. The drive assembly 49' is shown near an end of the handle cover assembly. Additionally, other structures, such as clips, fasteners, and other structures that may serve to facilitate insertion and removal of various components, as well as to provide sturdy support for such components once installed, may be used. Also illustrated is an activation button 58' which again is operatively associated with the handle cover assembly 10' and configured to permit a user to advance an amount of handle cover material. In alternative embodiments, it is contemplated that the button or similar device may be replaced with another device that permits the user to advance the handle cover material, such as a sensor (e.g., infrared sensor) that senses and is activated by user movement (e.g., waving). As before, it is contemplated that the handle cover assembly may be manually operated.

Installation/Use/Operation

Figure 11:
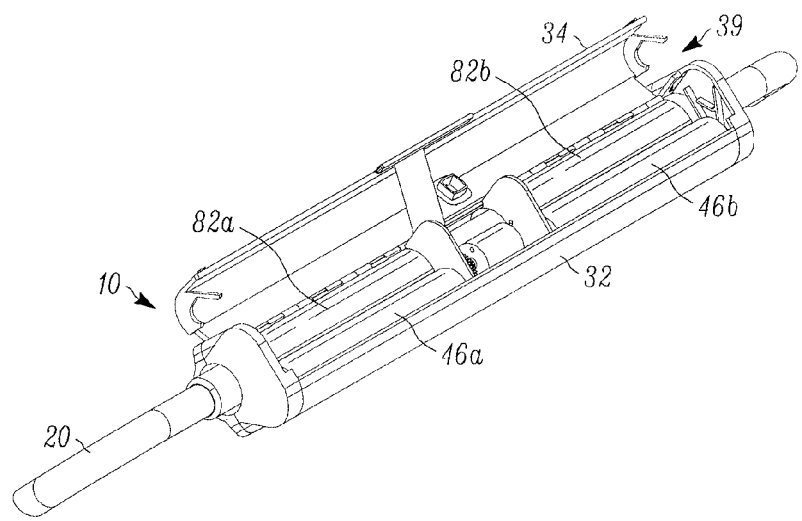
FIGS. 11 and 12 illustrate rear perspective views of the handle cover assembly of FIG. 5, with the assembly attached to the cart handle and shown in an open position, and further illustrating components of the assembly, in accordance with embodiments of the present disclosure.
Figure 12:
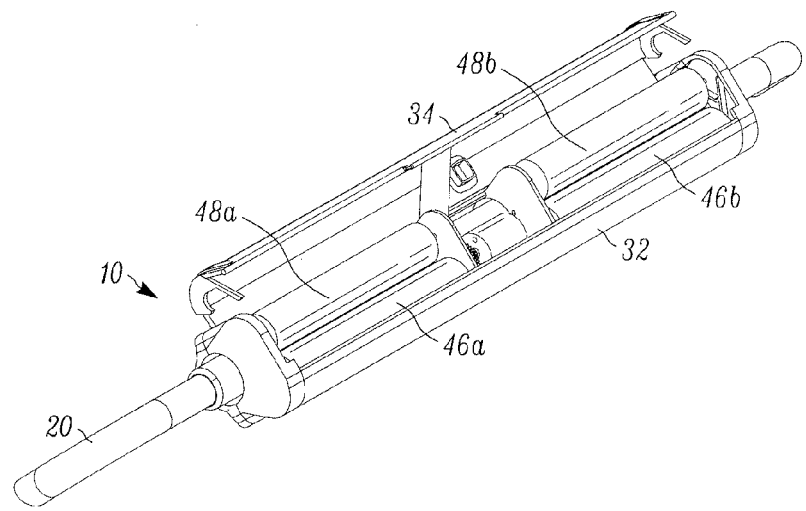
Figure 13:
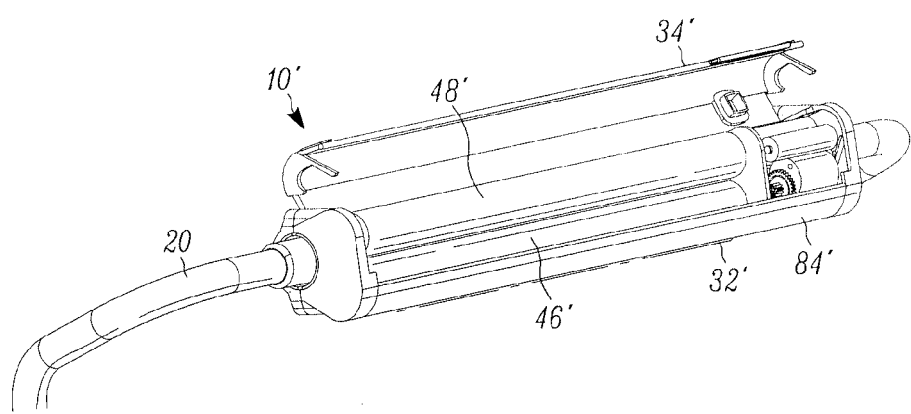
FIG. 13 illustrates rear perspective view of the handle cover assembly of FIG. 8, with the assembly attached to the cart handle and shown in an open position, and further illustrating components of the assembly, in accordance with embodiments of the present disclosure.
Figure 14:
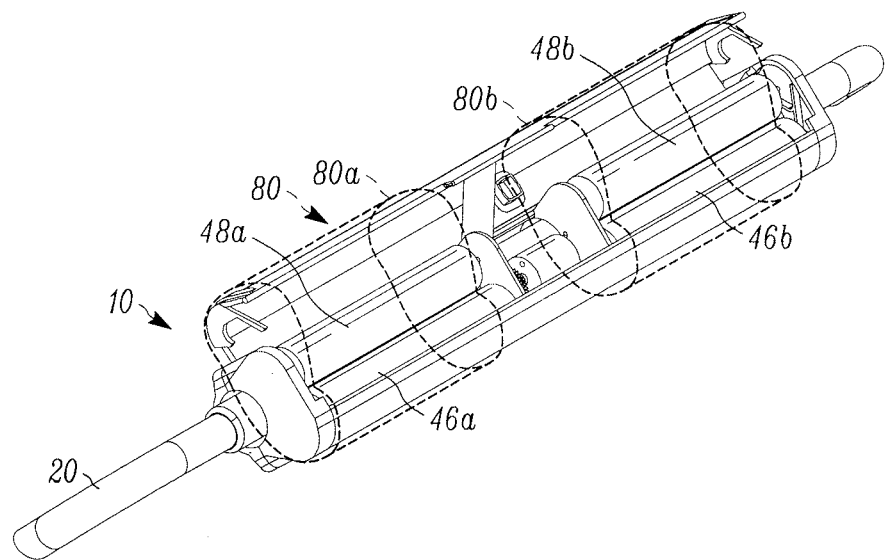
FIG. 14 illustrates a rear perspective view of the cart handle cover assembly, with the assembly attached to the cart handle and shown in an open position, and further illustrating use and installation of handle cover material, in accordance with embodiments of the present disclosure.
Figure 15:
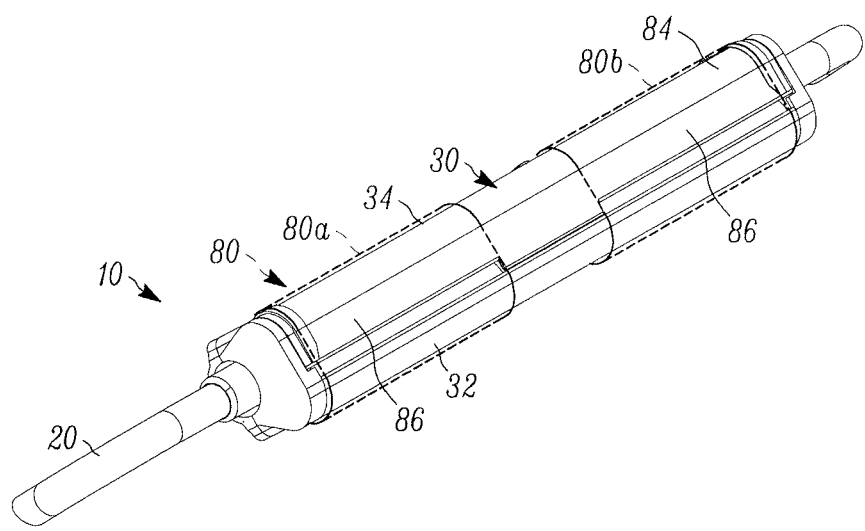
FIG. 15 illustrates a rear perspective view of the cart handle cover assembly of FIG. 11, again with the assembly attached to the cart handle, but now shown in a closed position, and further illustrating use and installation of the handle cover material, in accordance with embodiments of the present disclosure.

With reference to FIGS. 11, 12, 13, 14 and 15, installation, use and operation of the handle cover assembly 10 is described in accordance with embodiments of the present disclosure. FIGS. 11 and 12 illustrate rear perspective views of the handle cover assembly 10 of FIG. 5, with the assembly attached to the cart handle 20 and shown in an open position, and further illustrating installation of components of the assembly, in accordance with embodiments of the present disclosure. FIG. 13 illustrates a rear perspective view of the handle cover assembly 10' of FIG. 8, with the assembly attached to the cart handle and shown in an open position, and further illustrating components of the assembly, in accordance with embodiments of the present disclosure. FIG. 14 illustrates a rear perspective view of the cart handle cover assembly 10 of FIG. 5, with the assembly attached to the cart handle 20 and shown in an open position, and further illustrating use and installation of handle cover material 80 (shown in phantom), in accordance with embodiments of the present disclosure. And FIG. 15 illustrates a rear perspective view of the cart handle cover assembly 10 of FIG. 5, again with the assembly attached to the cart handle 20, but with the assembly now shown in a closed position, and further illustrating use and installation of the handle cover material 80, in accordance with embodiments of the present disclosure. While the description regarding use, installation and/or operation is provided with particular reference to the embodiment of FIG. 5, it will be appreciated and understood that the description is also applicable to the embodiment of FIG. 8, and other embodiments.

With reference to FIGS. 11 and 12, in accordance with at least some embodiments, the assembly 10 is provided to a user in an initial state, for example, without first and second handle cover receiving spool structures, 48*a-b*, or with such spool structures provided, but lacking any handle cover material. Positioning of the handle cover receiving spool structures 48*a-b* is at locations 82*a-b*, respectively, within the housing 30 of the handle cover assembly 10. Handle cover supply structures 46*a-b* are provided and installed in relation to the handle cover receiving spool structures as illustrated. Each of the handle cover supply structures 46*a-b* includes a respective handle cover material 80*a-b*, respectively, wound thereabout and collectively referred to as handle cover material 80. A leading end (not shown) of the handle cover material which is taped or otherwise secured in a manner that permits removal of the leading end and unwinding of the handle cover material(s) from the respective handle cover supply structure(s). For simplicity, the following description is generally provided to show installation, use, and operation in the context of a handle cover assembly having a plurality of sets of handle cover supply and receiving spools structures as previously described. FIG. 13 is provided to show, with some particularity, installation, use and operation in the context of the assembly 10' having only a single set of spool structures 46' and 48'. Differences will be appreciated, such as that the handle cover material would be dispensed or provided entirely or solely by way of the handle cover supply spool structure 46', as opposed to handle cover material being provided by more than a single such spool structure.

With reference again to FIGS. 11 and 12, leading ends (again not shown) of the handle cover material 80 (or respective amounts 80*a-b*) are unwound from the respective handle cover supply structures 46*a-b*, respectively, and then wound, or otherwise drawn about the handle cover assembly 10, and particularly, about its housing 30, and particularly the exterior surface 84 of the housing, while the housing is open so that the respective leading edges of handle cover material 80 (or respective amounts) can be affixed, using the tape or other securing mechanism, to the handle cover receiving spool structures 48*a-b*. In accordance with at least some embodiments, such tape or other securing mechanism is re-usable. As shown, the handle cover assembly housing 30 is closed and, more particularly, its second housing section 34, is closed via its hinged connection (not shown) with respect to the first housing section 32, as shown. In accordance with at least some embodiments, second housing section 34 can be divided in to multiple (e.g., two, three, four, etc.) cover portions when, as in the present instance, multiple handle cover material amounts or portions, noted generally by reference numerals 80*a-b* are provided to cover the exterior of the housing 30, so as to facilitate installation of handle cover material or portion thereof.

Once the housing 30 is closed, the handle cover material 80 (or respective amounts 80*a-b*) is typically primed by advancing a portion of the handle cover material lengthwise (e.g., longitudinally, circumferentially) about the exterior, and particularly the exterior surface 84, of the housing, which is generally substantially covered by the handle cover material 80, (or respective amounts), to provide handle grasping areas 86 and 88, as shown. Each such handle grasping area generally corresponds to the portion (in this case there are two such portions) of the exterior surface 84 of the housing 30 that is covered. Greater or fewer handle grasping areas may be provided depending on the number of respective pairs of handle cover material supply and receiving structures that are provided in a handle cover assembly. For example, it is noted here that in accordance with the embodiment of the handle cover assembly 10' of FIG. 13, generally only a single handle grasping area would be provided corresponding to the portion of the exterior surface 84 of the housing 30' that would be covered by the handle cover material. Moreover, it is noted that, where a plurality of handle grasping areas are provided, such areas may be similar or symmetrical in shape, or then may be sized differently from one another. Variation in the sizing and positioning of respective pairs of handle cover material supply and receiving structures thus can vary.

Additionally, in accordance with embodiments of the present disclosure, the handle cover material 80 (or respective amounts), once wound, wrapped or otherwise positioned to overlay or cover the housing 30, generally cover portions of each of the first, second and additional housing sections. However, it is contemplated that may not always be the case. For instance, the first and second housing sections may be offset or otherwise positioned from any additional section such that handle cover material (or respective amounts) does not cover any such additional housing section exterior surface. Moreover, in some embodiment, the additional housing section may not at all be necessary or included, such as when the handle cover assembly is provided not as alternative to an existing handle structure, but as the handle structure.

Such priming ensures that the handle cover material installed properly and the assembly 10 is ready for use by a user. Advancement may be triggered by any of a variety of mechanisms, including the touch of a button 58 (FIG. 3), a waving motion (e.g., by use of an infrared sensor), among others. Stated another way, the dispenser is automatically advanced a few times to ensure the handle cover material winds onto the receiving spool structure appropriately. The dispenser is then closed and ready for operation.

Additionally, when one or both handle cover supply structures 46a-b (or structures 46' and 48' in the embodiment of FIG. 8) are nearing depletion, that is, when a remaining amount of handle cover material 80 (or a respective amounts or portions) is low (e.g., an amount corresponding to only a few, such as 20, user uses), indication may be provided by the assembly. For example, LED indicator which can be located in the region indicated by numeral 86, or in another location, may start to flicker (e.g. blink) indicating that handle cover replenishment (e.g., via replacement of current handle cover supply spool structures with new such structures) is needed.

When the handle cover material 80 (or any of the respective amounts) is depleted, at least a portion of the exterior surface 84 previously covered by the handle cover material will be exposed. In such instances, it is contemplated that that handle cover material 80 (or respective portions) will include an additive (e.g., antimicrobial, copper additives, triclosan, etc.) in order to reduce or possibly minimize, if only for a period of time, additional build-up of germs. Further, the exterior surface 84 may include printing or other indicia (e.g., with a phrase 'replace handle cover') which is exposed upon depletion of handle cover material to suggest that is it is time to replenish the handle cover material amount(s). In order to accomplish such replenishment or replacement, the handle cover assembly housing 30 is opened, as shown in FIG. 9, and handle cover receiving spool structure 48a-b, which were once empty, but now include the total amount of handle cover material 80 (or respective amounts 80a-b) is removed and disposed of, or preferably, the material is recycled. Handle cover supply structures 46a-b are now fully depleted and can be removed. Alternatively, it is contemplated that depleted handle cover supply structures 46a-b can be re-positioned so as to be used as handle cover receiving structure 48a-b, when new handle cover supply structures 46a-b, having handle cover material 80, are provided. Again such teachings as set forth above regarding use, installation and/or operation are applicable to other embodiments, such as that of FIG. 8.

In accordance with alternative embodiments, a respective pair of handle cover supply spool and receiving spool structures are provided together, with the handle cover material of the supply spool structure (e.g., its leading edge) already taped or otherwise fastened (and thus in at least some sense assembled) to a surface of the receiving spool structure. Each respective pair of spool structures is placed, together, into the respective locations within the housing 30 as previously shown and described. The leading edge is unfastened, the handle cover material 80 is unwound and wrapped around the housing 30, the housing closed, and the material advanced and used until depleted, as previously described. In accordance with at least some embodiments, handle cover material can be provided entirely around the housing. Upon depletion, each respective pair of spool structures is removed for disposal and/or recycling.

With additional reference to FIGS. 5 and 8, in accordance with at least some embodiments of the present disclosure, at least a portion of a respective handle grasping portion is parallel with, or substantially parallel with, at least one respective pair of axes of rotation of a respective pair of handle cover supply and handle cover material receiving support structures (e.g., Ra, Rb, Rc, and Rd, or R' and R"). In accordance with at least some embodiments of the present disclosure, at least a portion of a respective handle grasping portion is parallel with, or substantially parallel with, at each respective pair of axes of rotation of a respective pair of handle cover material supply and handle cover material receiving support structures (e.g., Ra, Rb, Rc, and Rd, or R' and R"). Further in accordance with at least some embodiments of the present disclosure, at least a portion of each respective handle grasping portion is parallel with, or substantially parallel with, at least one respective pair of axes of rotation of a respective pair of handle cover supply and handle cover material receiving support structures (e.g., Ra, Rb, Rc, and Rd, or R' and R"). And further in accordance with at least some embodiments of the present disclosure, at least a portion of each respective handle grasping portion is parallel with, or substantially parallel with, each respective pair of axes of rotation of a respective pair of handle cover material supply and handle cover material receiving support structures (e.g., Ra, Rb, Rc, and Rd, or R' and R").

In accordance with embodiments of the present disclosure, a handle cover assembly is provided that can be configured to retrofit to any, or virtually any, cart handle, such as a shopping cart handle, a luggage cart handle, etc., or other structure having a handle. In other embodiments, a handle cover assembly is provided that can be integrated with the assembly of such carts or other structures during the manufacturing of such carts or other structures so that the handle cover assembly, or portions thereof, can be manufactured into position in the respective structure.

Figure 16:
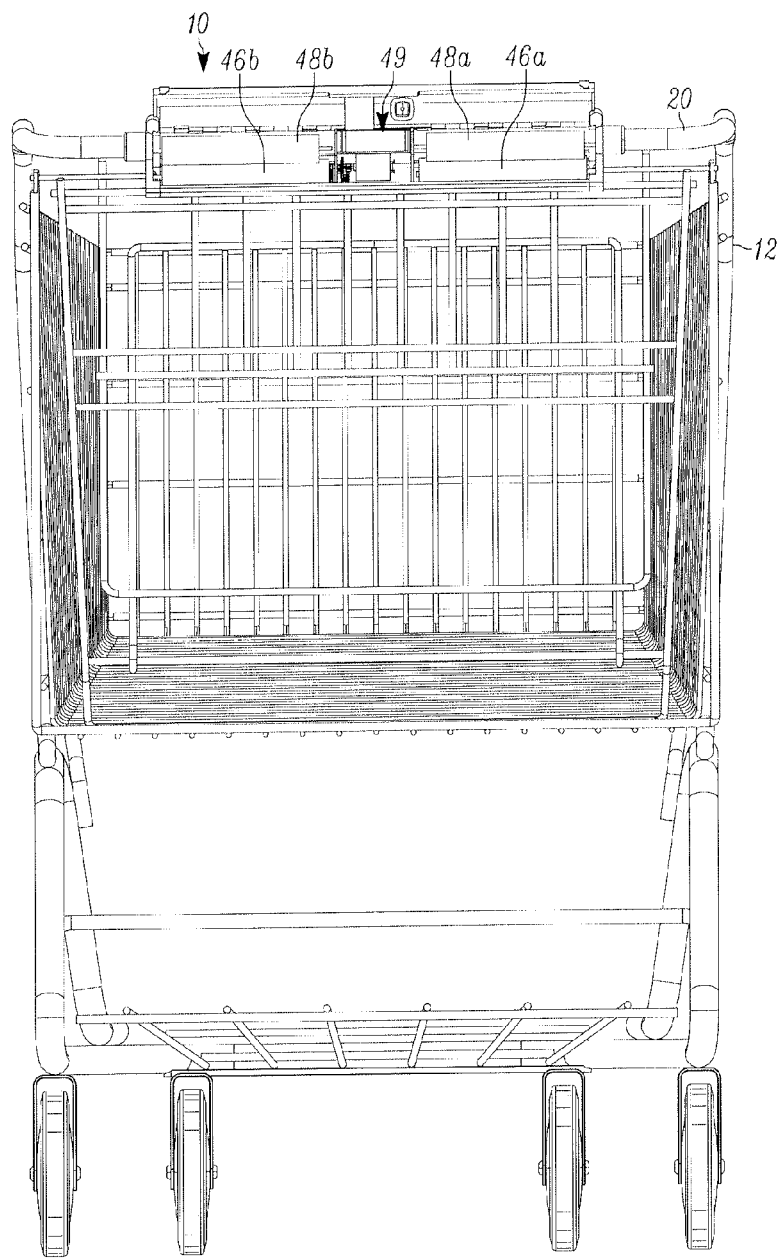
FIGS. 16-17 are rear views of handle cover assembly of FIG. 5, with the handle cover assembly of FIG. 16 shown connected to a cart and in an open position, and with the handle cover assembly of FIG. 17 shown connected to a cart, but in a closed position, in accordance with embodiments of the present disclosure.
Figure 17:
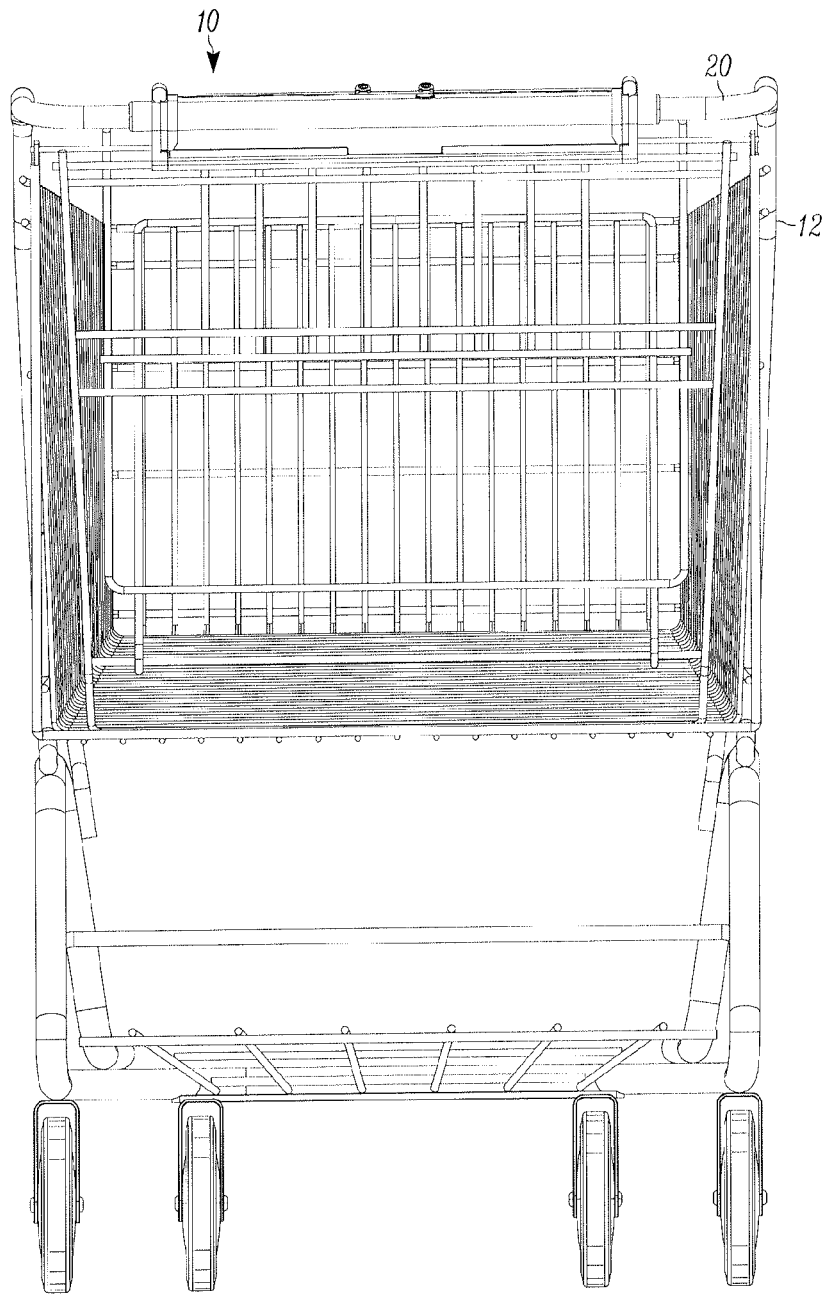

For example, FIGS. 16-17 are rear views of handle cover assembly 10 of FIG. 5. The handle cover assembly 10 shown in FIG. 16 is connected to a handle 20 of a cart 12 and shown in an open position. In this position, handle cover assembly components, such as the drive assembly 49 and the spool structures 46a-b and 48a-b are accessible, such as for installation (or repair or replacement) as previously noted. In contrast, the handle cover assembly 10 of FIG. 17, while again shown connected to a cart 12, is in a closed position, such as during use of the assembly.

Figure 18:
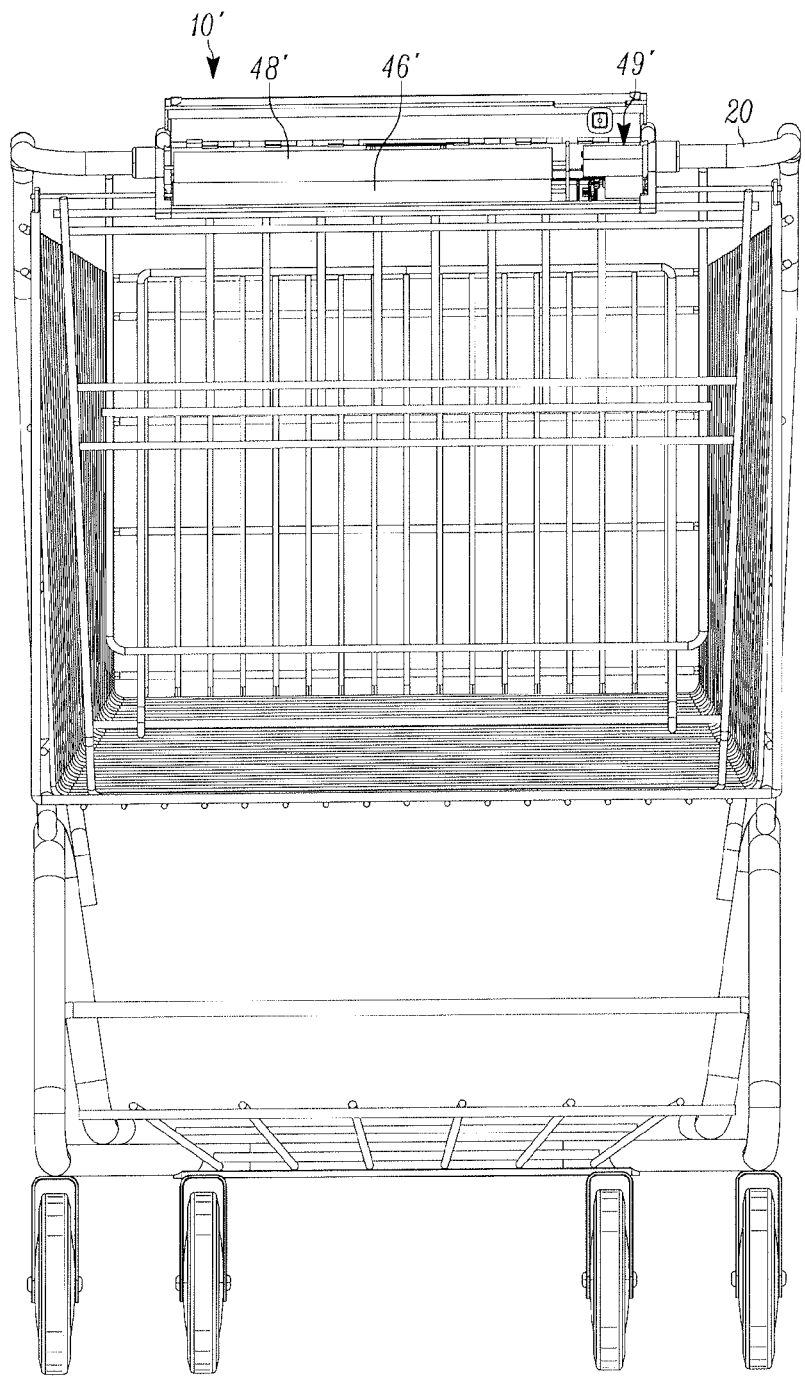
FIGS. 18-19 are rear views of handle cover assembly of FIG. 8, with the handle cover assembly of FIG. 18 shown connected to a cart and in an open position, and with the handle cover assembly of FIG. 19 shown connected to a cart, but in a closed position, in accordance with embodiments of the present disclosure.
Figure 19:
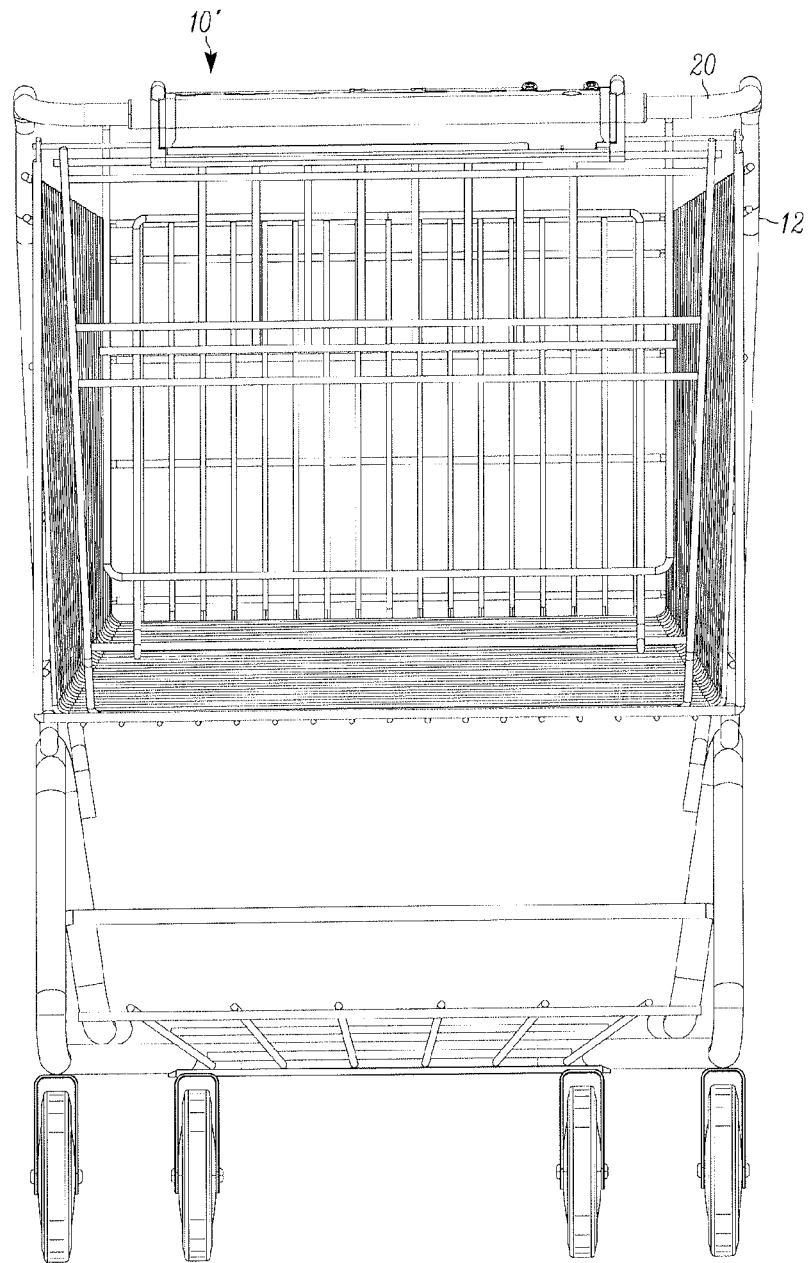

Additionally, FIGS. 18-19 are rear views of handle cover assembly 10' of FIG. 8. The handle cover assembly 10' shown in FIG. 18 is connected to a handle 20 of a cart 12 and shown in an open position. In this position, handle cover assembly components, such as the drive assembly 49' and the spool structures 46' and 48' are accessible, such as for installation (or repair or replacement) as previously noted. In contrast, the handle cover assembly 10' of FIG. 19, while again shown connected to a cart 12, is in a closed position, such as during use of the assembly.

In accordance with embodiments of the present disclosure, the handle cover material and be automatically advanced by virtue of any of a variety of "clean" methods, including but not limited to infrared (IR), such as by wave—no touch methods, touch, by virtue of button or switch (including by use of elbow, etc.), or other structures, such as coins, etc. Advantageously, in accordance with at least some embodiments, the system can integrate speakers or other structures (e.g., piezos) to provide sound and "announce" or otherwise convey information to a user, such as discounts, sales, on items, which may be beneficial in at least some settings (e.g., a store).

Alternatively, electronic messages could be incorporated and, for example, using RFID, Bluetooth or other type of signaling device convey information from transmitters which can be sent to a printed circuit board (PCB), of dispenser, functioning as a receiver and providing the message. For example, it is contemplated that messages could be sent or otherwise provided using the handle cover assembly when the assembly is in a particular location. In this way, messages relevant to a particular product (e.g., product promotional messages) could be sent from a store aisle to the handle cover assembly PCB when the assembly is in proximity to that particular product. LED's can be included to signal, for example, power on/off, low battery power status, if handle cover material is used or new, that the handle cover assembly (or one or more supply spool structures) is in need of refill or replenishment (i.e., all or nearly all of the handle cover material has been dispensed), and the like. Additionally, in various embodiments of the disclosure, the assembly further includes a printed circuit board ("PCB") that incorporates various LED's, switches, buttons, and other sensing device electronics. Such electronics and circuitry can be varied without departing from the scope of the present disclosure.

In accordance with embodiments of the present disclosure, the housing has a shape that is contoured to efficiently cover and contain the internal handle cover assembly components in an aesthetically pleasing fashion. For example, as shown, one or more of the housing sections can be curved. It will be apparent that the shape of the housing, or any sections or portions of the housing, can vary to convenience without departing from the spirit and scope of the present disclosure, and that the disclosure should not be limited by any specific shape of the housing (or housing section, portion, etc.). In accordance with embodiments of the present disclosure, short or long wave object detection IR (long pulse/short pulse and high/low frequency) and/or capacitance sensing can be used to automatically advance handle cover material. LED's and the IR can be located underneath a window that can be positioned, sized and angled accordingly to ensure efficacy.

As used herein, the term "handle" includes parts that are or may be held, touched, or operated by one's hand(s). Moreover, the term a "handle", as used herein, can include—but does not necessarily require—the presence of various handle or handle-like components, including that it can be used to describe a portion of handle, a portion of a surface (e.g., handle cover assembly housing exterior surface), or some other structure or portion of a structure and the like.

The handle cover assembly, in accordance with at least some embodiments, can be oriented for left-handed, right-handed, or both right and left handed use, as desired. As such, the relative orientation of the dispenser in its ultimate configuration (e.g., when attached to a cart or other structure) can be selected based on a number of parameters, including by way of example, the end-use application, the intended user, etc. Still, it should be understood that the orientation of the device in its ultimate configuration can vary to convenience, and that the orientations illustrated herein with respect to the various embodiments are selected for purposes of illustration and explanation. As such, the disclosure should not be limited by any particular end-use orientation.

It is contemplated that, while particular components or structures are shown in a particular position, such components may be interchanged or rearranged. For example, placement of the drive assembly, including its motor, in relation to one or more sets or pairs of supply and receiving spool structures can vary. For example, the drive assembly may be positioned between the spool structures, or on or at an end of a single set of such structures as previously shown or described.

The handle cover material of the present disclosure typically take the form of a continuous material (which can take the form of a continuous sleeve or bag), or a plurality of connected and yet discrete handle covers (which can also take the form of discrete, but connected sleeves or bags) that are typically made from a plastic or plastic-like material. The term "handle cover material" as used herein generally describes types of handle covers suitable for use with respect to handles. However, the term should not be used in a limiting sense. For example, continuous handle covers are contemplated, as are discrete but still connected handle covers. The handle cover material of the kind contemplated for use in at least some embodiments the present disclosure typically surround or substantially surround, in overlay fashion, the handle cover assembly housing (which can be configured to serve, or have a portion that serves, as a handle), its exterior surface, or a section or additional section thereof. The handle cover material is typically sized and shaped to conform to or mimic the size and/or shape of the handles (or surfaces or portions of surfaces serving as a housing). Still, various types, sizes and overall geometries for the handle cover material are contemplated and considered within the scope of the present disclosure beyond those described herein. Thus, the disclosure should not be considered limited to any particular handle cover material. It is contemplated that, in accordance with embodiments of the present disclosure, polyethelene plastic material ranging from low to high density can be used, and such material is indicated here by way of example, but not limitation. In at least some embodiments, it is contemplated that biodegradable materials can be used. Furthermore, handle cover material, in at least some embodiments, can be treated (or not treated) with static electricity treatment and printing of various logos, colors, etc. The size and configuration of the handle cover material can vary to convenience. For example, the handle cover material can be spooled flat or folded in half to reduce size of assembly.

In at least some embodiments, the housing 30 can include a locking structure to secure contents of the handle cover assembly 10. The lock can be can be key-specific, as opposed to a lock that can be opened using generally available implements (e.g., a screwdriver, etc.), and this feature can be customer-specific so as to vary from customer to customer). Also, if tampering or theft is not deemed an issue, the lock can be replaced with fastening means, e.g., a friction tab, which is or may not lockable.

In accordance with various embodiments, one or both of the respective handle cover material receiving spool structures is/are typically driven by the gear train or assembly. That is, the supply or providing spool structures are typically not driven. Stated another way, one or more (if a plurality) of the respective handle cover material receiving spool structures typically serve to pull the handle cover material from the supply spool structure. Still, other arrangements are contemplated and considered within the scope of the present disclosure.

In accordance with embodiments of the disclosure, when the dispenser is to be used (i.e., once the handle cover material is installed noted above), a user can signal and the assembly, utilizing the electromechanical mechanisms or devices (e.g., infrared, capacitance, etc.) automatically advances the handle cover material a predetermined amount. The user can grasp the handle cover assembly housing or a portion thereof, such as at one or more grasping areas, thereby touching and grasping the handle cover material that overlays the housing. In accordance with at least some embodiments, the handle cover material (or amounts) are provided to entirely surround the housing or other structural portion(s) which can serve as or be configured or structured to serve as a handle for a user. For example, where the structural portion is cylindrical, handle cover material (or amounts or portions) can, in at least some embodiments, cover up to one hundred percent (100%) of the surface circumferentially. In this way, respective one or more grasping areas can cover the entire area(s) that could potentially be touched by a user.

The assembly is connected to a structure (e.g., a cart). The user pulls (or pushes) the assembly (as s/he would normally do) and accomplishes the end goal (e.g., moving the cart over a distance and for a period of time). Once accomplished, the user releases the handle, as well as the handle cover material. The user, or a new user, desires a fresh, hygienic, unsoiled or unused handle cover. The user, or new user, signals and the handle cover material is advanced a predetermined or desired amount. The used or soiled handle cover material (that portion touched by the user or previous user) is returned and collected to the receiving spool structure and additional handle cover material is supplied from the providing spool structure the handle, handle assembly housing, other structure, or a portion thereof. This process is repeated until fresh handle cover material supply is depleted, at which point the device will indicate such depletion is imminent or has occurred. The supply spool structure that is depleted of fresh handle cover material supply is removed and/or can be recycled. The used handle cover material itself can be recycled.

In accordance with embodiments of the present disclosure, one or more object detection sensors (e.g., infrared, motion or capacitance sensors) and other devices can be used to advance the handle cover material (or respective portions). Such technology can be programmed with multiple IR ranges (e.g., distances of detection) and pulse rates (sample detection) so as to optimize a particular need for a particular environment. Furthermore, the devices can be programmed so that the IR advances the handle cover material only after a user exits the IR range (after use— automatic advancement of cover material occurs), or alternatively, programmed so that the user has to proactively activate the automatic advance of handle cover material prior to using the handle by maintaining the user's hand in view of the IR for a certain predetermined (and selectable) amount of time (typically referred to in industry as "wave"). These and other options can be programmed and selected, and thus, vary to convenience. For example, a switch (e.g., a dip switch) can be used to choose an optimal programming for material advancement. The object detection devices are contemplated to achieve automatic advancing of handle cover material. Other devices and associated programming of such devices is described herein which facilitates and/or assists in monitoring and/or measuring handle cover material supply (e.g., dosing of material).

In general, with reference to the at least some of the above-described embodiments for the handle cover assembly, a user can grasp the assembly housing, which can be configured to serve as a handle, or some other structure. When the assembly is connected or otherwise secured to a supporting structure such as a cart, the handle will permit a user to move the cart. Using one or more sensing or switch technologies, automatic advancing of handle cover material is effected after appropriate or desired by a user. Also, a handle cover material can be advanced automatically via one or more sensors, and user movement (e.g., hand movement) can activate such sensor(s). Handle cover material advancement is driven by a drive assembly, typically comprising a battery-powered motor assembly that itself is typically housed within the assembly housing (along with the one or more batteries and other assembly components), although this is not required. Sensor or switch technology is used to meter and/or measure appropriate dispensing of the handle cover material, with the amount dispensed (or received or taken up) depending on a number of factors, including: 1) assembly and assembly component size; 2) handle cover material type and thickness; 3) size (e.g., length, diameter, etc.) of the handle or handle cover assembly housing (or portion) covered; and number of uses desired prior to exhaustion or depletion of the handle cover supply. Advantageously, the assemblies are securable in a orientation to promote dispensing of handle cover material. Moreover, the assembly housing can be lockable, making re-filling easy to accomplish while minimizing the threat of tampering with internal dispenser contents and/or components by other than by desired personnel.

As noted previously, the assembly housing (and sections) can be sized and shaped to convenience and to serve as a handle, or work in conjunction with another structure or handle, that can be sized and shaped to convenience. For example, the handle can be extended for use in various applications. The automatic handle cover assembly is contemplated for use in a variety of applications, such as on carts used in shopping and other venues (e.g., airports, train stations, retailers, etc.). The assembly housing itself can be made from a variety of materials. In one embodiment, the housing can comprise an translucent, material, and in another embodiment, the housing can comprise an opaque and/or metallic (e.g., chrome, metal) material. While it is contemplated that the housing can be made of a single material, it is also contemplated that one or more materials might be used to construct one housing section, a different material might be used to construct another of the housing sections (e.g., the main housing section might be made of plastic, while a secondary housing section might be made of chrome or metal).

In accordance with at least some embodiments of the present disclosure, the handle cover assembly may comprise one or more structures that ensures or enhances the weather resistance. By way of example and not limitation, in at least some embodiments, one or more standard gaskets (not shown) can be incorporated into the assembly to protect all, most or some of the mechanical and/or electronic components. In other embodiments, electronics or other components may be dipped or coated in or with a material (e.g., silicone, etc.) to further provide protect or weatherization. In still other embodiments, an additional accessory part or structure (not shown) could be used that could cover over the unit to further protect the assembly or components from the weather.

In general, advantageously, at least some of the above-described embodiments can be used as a "retrofit" in virtually any type of cart or other. Advantageously, it is still possible to utilize the cart or other structure (e.g., via the handle cover assembly) even after all sanitary handle covers have been dispensed, or, if not functioning for any reason. Moreover, the embodiments are typically battery-powered. Object-detection sensors are typically employed to initiate advancement of the handle cover material, and can drive the handle cover material advancement over a predetermined distance (so as to replenish used cover material with unused material). Mechanical or electronic switch (e.g., micro switch), and/or smart chip technologies, among others, can be employed and used to determine the amount of sleeve or sleeve material to advance and also to determine when sleeve refill is required (i.e., upon depletion of the sleeves or sleeve material from the dispenser), LED's and/or sound (e.g., beeping) technology can be employed to signify when, for example, re-fill and/or new batteries are required. If the device malfunctions in some manner, an automatic shut off mechanism is contemplated. According to various aspects of the present disclosure, the handle cover assembly, its spool structures, can be described as "re-Tillable", "recyclable", and "disposable".

It is understood that the above-mentioned sensor and switch technology comprise components and software (as well as associated algorithms). Such components and applications are generally available. Software applications and associated programming can be customized according to the specific needs of the end use and/or to leverage the various components used.

As noted above, the amount or quantity of handle cover material contained in the dispenser depends on a number of variables, Still, the number of such "sanitary experiences" can vary to convenience. Various options for selecting the type and/or quantity of handle cover material are available. In one embodiment, for example, a customer might have the choice between a thick material and a relatively thin material. In another embodiment, a customer might be able to select from one of a short, medium and long handle. Options such as these can vary to convenience within or based on parameters that may be set, for example, by the manufacturer and customer. Each generally requires specific programming to ensure that all desired parameters are recognizable by the PCB and to permit appropriate amount of handle cover material to be used.

As noted above, the sensor technology utilized can vary to convenience. According to one aspect, the sensor technology used can comprise infrared, occupant sensing, capacitance sensing, all range and pulse variations of IR, and other sensor technology. Using known infrared technology (e.g., using a transmitter and a receiver), automatic advancement of handle cover material can be accomplished such that the material (e.g., the sleeve material) is advanced upon release of a user's hand from the handle. Use of such technology is appropriate in both low traffic and high traffic environments, such as when refills can be accomplished efficiently and frequently. In accordance with another aspect of the present disclosure, commonly termed 'wave sensing' (or short pulse and short range IR) technology can be used. Use of such technology is appropriate when it is desired to have handle cover material advancement tied to waving of a user's hand, and particularly, when it is desired to permit the user to decide when an unused material is desired (i.e., as opposed to automatic advancement of sleeves regardless of the user's desire). In accordance with yet another aspect of the present embodiment, capacitance and/or motion-sensing technology (or object-detection sensing) can be used. Standard capacitance and/or motion sensors can permit automatic advancement of sleeves, for example, when a door closes, hand is at a specified distance from the handle, or when the hand is removed from the handle. Here again, use of such technology is appropriate in both low traffic and high traffic environments, such as when refills can be accomplished efficiently and frequently. And in accordance with yet another aspect of the present disclosure, a combination of the aforementioned sensing technologies can be employed, permitting a customer and/or end user to decide which advancing technology and associated programming is optimal.

In general, variations can be made to the housing, gearing, handle, assembly and other device, structure or component configurations and components in these and other embodiments of or associated with the present disclosure. Such variations are contemplated and considered within the scope of the present disclosure and the present disclosure should not be considered limited by any particular configurations shown, including any in which the embodiment or portion of the embodiment can be selected or varied based on design criteria, or which are a matter of design choice and thus can vary to convenience.

From the foregoing and as mentioned above, it will be observed that numerous variations and modifications can and may be effected without departing from the spirit and scope of the novel concepts of the disclosure. It is to be understood that no limitation with respect to the specific methods and apparatus illustrated herein is intended or should be inferred. It is, of course, intended to cover by the appended claims all such modifications as fall within the scope of the claims.

The invention claimed is:

1. A handle cover assembly comprising:
a housing structure having an interior;
a first handle cover material-providing spool structure positioned at least partially within the interior and rotatable about a first handle cover material-providing spool structure axis of rotation; and
a first handle cover material-receiving spool structure positioned at least partially within the housing structure interior and rotatable about a first handle cover material-receiving spool structure axis of rotation that is at least substantially parallel to, but offset from, the first handle cover material-providing spool structure axis of rotation;
wherein the first handle cover material-providing spool structure includes a handle cover material and an amount of the handle cover material is provided from the first handle cover material-providing spool structure about at least a portion of an exterior surface of the housing structure so as to substantially surround and cover the at least a portion of the exterior surface of the housing structure;
wherein the amount of the handle cover material is received by the first handle cover material-receiving spool structure;
wherein the at least a portion of the exterior surface of the housing structure substantially surrounds the first handle cover material-providing spool and the first handle cover material-receiving spool structure; and
wherein the at least a portion of the exterior surface of the housing structure is configured to serve as a handle, and further comprising a handle grasping area that generally corresponds to the portion of the exterior surface of the housing that is covered by the amount of the handle cover material, or a portion of the handle cover material.

2. The handle cover assembly of claim 1, wherein each of the first handle cover material-providing spool structure and the first handle cover material-receiving spool structure are selected from one of the following: a spool, a roller and a reel.

3. The handle cover assembly of claim 2, wherein the first handle cover material-providing spool structure and the first handle cover material-receiving spool structure are substantially within the interior of the housing.

4. The handle cover assembly of claim 3, wherein the housing includes a first section and a second section, hingedly coupled to each other to permit opening and closing of the housing structure.

5. The handle cover assembly of claim 4, wherein the housing is configured to be connected to another structure.

6. The handle cover assembly of claim 5, wherein the housing includes an additional section that is structured to be connected to a handle of the another structure.

7. The handle cover assembly of claim 6, wherein the another structure is a cart selected from at least one of a grocery cart and a luggage cart.

8. The handle cover assembly of claim 1, wherein the at least a portion of the exterior surface of the housing is at least substantially parallel to each of the axes of rotation of the first handle cover material-providing spool structure and the first handle cover material-receiving spool structure, respectively.

9. The handle cover assembly of claim 1, wherein the at least a portion of the handle grasping area is at least substantially parallel to each of the axes of rotation of the first handle cover material-providing spool structure and the first handle cover material-receiving spool structure, respectively.

10. The handle cover assembly of claim 1, further comprising a second handle cover material-providing spool structure positioned at least partially within in the interior and rotatable about a second handle cover material-providing spool structure axis of rotation; and a second handle cover material-receiving spool structure positioned at least partially within the housing structure interior and rotatable about a second handle cover material-receiving spool structure axis of rotation that is at least substantially parallel to, but offset from, the second handle cover material-providing spool structure axis of rotation.

11. The handle cover assembly of claim 10, wherein the first handle cover material-providing spool structure includes a first handle cover material and the second handle cover material-providing spool structure includes a second handle cover material, and wherein:
an amount of the first handle cover material is provided from the first handle cover material-providing spool structure, further provided about, so as to cover, a first portion of an exterior surface of the housing structure, and received using the first handle cover material-receiving spool structure within the interior of the housing;
an amount of the second handle cover material is provided from second handle cover material-providing spool structure, further provided about, so as to cover, a second portion of the exterior surface of the housing structure, and received using the second handle cover material-receiving spool structure within the interior of the housing.

12. The handle cover assembly of claim 11, wherein the first and second portions of the exterior surface are each configured to serve as a handle, and further comprising a first handle grasping area and a second handle grasping area, the respective first and second handle grasping areas generally corresponding to the first portion and second portions of the exterior surface of the housing, respectively, that are covered by the respective amounts of handle cover material, or respective portions thereof.

13. The handle cover assembly of claim 12, wherein each of the first and second handle cover material-providing spool structures and each of the first and second handle cover material-receiving spool structures are selected from one of the following: a spool, a roller and a reel.

14. The handle cover assembly of claim 13, wherein the housing is configured to be connected to another structure.

15. The handle cover assembly of claim 1, further comprising a drive assembly for driving or advancing the handle cover material.

16. A method comprising:
providing the handle cover assembly of claim 1;
providing a grasping area that generally corresponds to the portion of the exterior surface of the housing that is covered by the amount of the handle cover material, or a portion thereof, wherein the at least a portion of the exterior surface is configured to serve as a handle.

17. The method of claim 16, further comprising a drive assembly, positioned in the interior of the housing and connected to the first handle cover material-receiving spool structure, and the method further comprises, advancing, using the drive assembly, the handle cover material.

18. The method of claim 16, further comprising, upon depletion of at least some of the handle cover material from the handle cover assembly, refilling the handle cover assembly with additional handle cover material.

19. The method of claim 18, wherein the refilling includes: (i) removing the handle cover material-receiving receiving spool from a location, and (ii) placing the handle cover material-receiving spool structure in the location, so as to re-use the handle cover material-receiving spool structure.

20. The method of claim 18, wherein the refilling includes removing and replace each of the handle cover providing and receiving spool structures.

21. The method of claim 18, wherein the method further includes connecting the housing, or configuring the housing for connection, to another structure.

22. A combination comprising:
a handle cover assembly comprising:
a housing structure having an interior;
a first handle cover material-providing spool structure positioned at least partially within the interior and rotatable about a first handle cover material-providing spool structure axis of rotation; and
a first handle cover material-receiving spool structure positioned at least partially within the housing structure interior and rotatable about a first handle cover material-receiving spool structure axis of rotation that is at least substantially parallel to, but offset from, the first handle cover material-providing spool structure axis of rotation;
wherein the first handle cover material-providing spool structure includes a handle cover material and an amount of the handle cover material is provided from the first handle cover material-providing spool structure about at least a portion of an exterior surface of the housing structure so as to substantially surround and cover the at least a portion of the exterior surface of the housing structure;

wherein the amount of the handle cover material is received by the first handle cover material-receiving spool structure;

wherein the at least a portion of the exterior surface of the housing structure substantially surrounds the first handle cover material-providing spool and the first handle cover material-receiving spool structure; and wherein the at least a portion of the exterior surface of the housing structure is configured to serve as a handle, and further comprising a handle grasping area that generally corresponds to the portion of the exterior surface of the housing that is covered by the amount of the handle cover material, or a portion of the handle cover material, and an additional structure having, or configured for use, with a handle;

the handle cover assembly configured to be connected to the handle.

23. The combination of claim 22, wherein the additional structure is a cart.

\* \* \* \* \*